(12) United States Patent
Avanzi et al.

(10) Patent No.: US 10,027,640 B2
(45) Date of Patent: Jul. 17, 2018

(54) SECURE DATA RE-ENCRYPTION

(71) Applicant: QUALCOMM Incorporated, San Diego, CA (US)

(72) Inventors: Roberto Avanzi, Munich (DE); Rosario Cammarota, San Diego, CA (US); Ron Keidar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 14/862,059

(22) Filed: Sep. 22, 2015

(65) Prior Publication Data

US 2017/0085540 A1 Mar. 23, 2017

(51) Int. Cl.
*H04L 29/06* (2006.01)
*H04L 9/08* (2006.01)
(Continued)

(52) U.S. Cl.
CPC .......... *H04L 63/061* (2013.01); *H04L 9/0877* (2013.01); *H04L 63/0428* (2013.01); *H04L 63/062* (2013.01); *H04L 63/0853* (2013.01); *H04W 12/02* (2013.01); *H04L 2209/60* (2013.01); *H04L 2209/80* (2013.01); *H04W 4/70* (2018.02)

(58) Field of Classification Search
CPC . H04L 63/061; H04L 63/0428; H04L 63/062; H04L 63/0853; H04L 9/0877; H04W 12/02
See application file for complete search history.

(56) References Cited

U.S. PATENT DOCUMENTS 5,805,706 A 9/1998 Davis
7,093,295 B1 8/2006 Saito
(Continued)

FOREIGN PATENT DOCUMENTS

EP 2871798 A1 5/2015

OTHER PUBLICATIONS

International Search Report and Written Opinion—PCT/US2016/044216—ISA/EPO—dated Mar. 1, 2017—11 pgs.
(Continued)

*Primary Examiner* — Saleh Najjar
*Assistant Examiner* — Louis C Teng
(74) *Attorney, Agent, or Firm* — Hunter Clark PLLC (57) ABSTRACT

A method includes: decrypting, in a device, a first subset of encrypted data using a cryptographic device key associated with the device to produce first plain text, where a set of encrypted data comprises the first subset of encrypted data and a second subset of encrypted data, and where the first subset of encrypted data and the second subset of encrypted data each contain less encrypted data than the set of encrypted data and are different from each other; decrypting, in the device, the second subset of encrypted data using the cryptographic device key to produce second plain text; encrypting, in the device, the first plain text using a first ephemeral key to produce first re-encrypted data; and encrypting, in the device, the second plain text using a second ephemeral key to produce second re-encrypted data, the second ephemeral key being different from the first ephemeral key.

30 Claims, 7 Drawing Sheets

(51) Int. Cl.
*H04W 12/02* (2009.01)
*H04W 4/70* (2018.01)

(56) References Cited

U.S. PATENT DOCUMENTS

| | | | |
|---|---|---|---|
| 7,986,785 B2 | 7/2011 | Saito | |
| 8,549,367 B1* | 10/2013 | Sherred | G11C 29/10 |
| | | | 380/2 |
| 8,565,436 B2* | 10/2013 | Mansour | H04L 9/003 |
| | | | 380/281 |
| 9,037,861 B2* | 5/2015 | Arya | H04L 63/0464 |
| | | | 380/239 |
| 9,313,023 B1* | 4/2016 | Murray | G09C 1/00 |
| 9,600,421 B2* | 3/2017 | Miller | G06F 12/1408 |
| 2002/0181709 A1* | 12/2002 | Sorimachi | H04L 9/0662 |
| | | | 380/252 |
| 2003/0220903 A1* | 11/2003 | Mont | G06F 17/30171 |
| 2009/0003598 A1* | 1/2009 | Itoh | H04L 9/003 |
| | | | 380/46 |
| 2009/0187771 A1* | 7/2009 | McLellan, Jr. | H04L 9/0891 |
| | | | 713/193 |
| 2010/0146292 A1* | 6/2010 | Shi | H04L 9/321 |
| | | | 713/189 |
| 2010/0150352 A1* | 6/2010 | Mansour | H04L 9/003 |
| | | | 380/281 |
| 2010/0313016 A1 | 12/2010 | Zhang et al. | |
| 2012/0054499 A1 | 3/2012 | Eklund et al. | |
| 2013/0332745 A1 | 12/2013 | Woodall | |
| 2014/0164776 A1* | 6/2014 | Hook | H04L 9/14 |
| | | | 713/171 |
| 2015/0006905 A1* | 1/2015 | Avanzi | H04L 9/0618 |
| | | | 713/189 |
| 2015/0200917 A1 | 7/2015 | Fujii et al. | |
| 2016/0218872 A1* | 7/2016 | Anderson | G06F 8/71 |
| 2017/0024568 A1* | 1/2017 | Pappachan | G06F 13/28 |

OTHER PUBLICATIONS

International Preliminary Report on Patentability—PCT/US2016/044216 The International Bureau of WIPO—Geneva, Switzerland, dated Nov. 16, 2017.
Second Written Opinion from International Application No. PCT/US2016/044216, dated Aug. 21, 2017, 6 Pages.

* cited by examiner

SECURE DATA RE-ENCRYPTION

BACKGROUND

As electronic devices and their uses have increased, so too has the profitability of improperly (e.g., without authorization) accessing data on these devices. For example, unsecure data may be accessed and used for profit, e.g., sold to others, the information used to provide targeted advertising, etc. Further, if the data accessed are instructions for execution by a processor, then the instructions may be used in an unintended manner (e.g., altered, used out of the intended sequence, etc.) and/or the electronic device may be caused to use the instructions in an unintended manner. Consequently, data may be sent to electronic devices, and stored by the electronic devices, in an encrypted format. When the data are to be used, e.g., read or executed, the data may be decrypted and the decrypted data may be accessible in an unencrypted format.

SUMMARY

An example method includes: decrypting, in a device, a first subset of encrypted data using a cryptographic device key associated with the device to produce first plain text, where a set of encrypted data comprises the first subset of encrypted data and a second subset of encrypted data, and where the first subset of encrypted data and the second subset of encrypted data each contain less encrypted data than the set of encrypted data and are different from each other; decrypting, in the device, the second subset of encrypted data using the cryptographic device key associated with the device to produce second plain text; encrypting, in the device, the first plain text using a first ephemeral key to produce first re-encrypted data; and encrypting, in the device, the second plain text using a second ephemeral key to produce second re-encrypted data, the second ephemeral key being different from the first ephemeral key.

An example device includes: a memory; and a hardware cryptographic processor communicatively coupled to the memory and comprising: a decryption engine configured to: decrypt a first subset of encrypted data using a cryptographic device key associated with the device to produce first plain text; and decrypt a second subset of encrypted data using the cryptographic device key associated with the device to produce second plain text; where a set of encrypted data comprises the first subset of encrypted data and the second subset of encrypted data, and where the first subset of encrypted data and the second subset of encrypted data each contain less encrypted data than the set of encrypted data and are different from each other; and an encryption engine communicatively coupled to the decryption engine and configured to: encrypt the first plain text using a first ephemeral key to produce first re-encrypted data; and encrypt the second plain text using a second ephemeral key to produce second re-encrypted data, the second ephemeral key being different from the first ephemeral key.

Another example device includes: decryption means for: decrypting a first subset of encrypted data using a cryptographic device key associated with the device to produce first plain text; and decrypting a second subset of encrypted data using the cryptographic device key associated with the device to produce second plain text; where a set of encrypted data comprises the first subset of encrypted data and the second subset of encrypted data, and where the first subset of encrypted data and the second subset of encrypted data each contain less encrypted data than the set of encrypted data and are different from each other; and encryption means, communicatively coupled to the decryption means, for: encrypting the first plain text using a first ephemeral key to produce first re-encrypted data; and encrypting the second plain text using a second ephemeral key to produce second re-encrypted data, the second ephemeral key being different from the first ephemeral key.

Items and/or techniques described herein may provide one or more of the following capabilities, as well as other capabilities not mentioned. Sensitive data in an electronic device may be inhibited from being determined by an unauthorized observer. Processor-executable instructions may be stored for execution in a manner that inhibits inferential determination despite access to the instructions. Data may be re-encrypted securely and quickly for storage and/or further use. Sensitive data may be decrypted and re-encrypted without plain text being accessible, e.g., in main memory. Bulk, on-the-fly re-encryption of data may be performed so that data, e.g., large amounts of data, may be encrypted and used upon being re-encrypted. Other capabilities may be provided and not every implementation according to the disclosure must provide any, let alone all, of the capabilities discussed.

DETAILED DESCRIPTION

Techniques are discussed herein for decrypting and re-encrypting data securely. For example, encrypted data may be downloaded from a data source to a device, decrypted, re-encrypted using a cryptographic device key associated with the device, and stored in memory of the device, e.g., on a disk. As another example, encrypted data stored on the disk may be decrypted, re-encrypted using an ephemeral key, and stored in memory of the device, e.g., a main memory (e.g., random-access memory) of the device. The encrypted data may be, for example, instructions for a processor and different portions, e.g., pages, of the instructions may be re-encrypted using different ephemeral keys. Further, the re-encrypted data may be randomized using a nonce before being stored. As another example, re-encrypted data stored in the main memory of the device may be de-randomized, if appropriate, decrypted using a corresponding ephemeral key used to produce the re-encrypted data, re-re-encrypted using a device cryptographic key associated with the device, and stored in memory of the device, e.g., on a disk. The data stored to disk may be randomized before being stored. As a further example technique, data that have previously been read from disk, decrypted, re-encrypted with an ephemeral key, randomized using a nonce, and stored that may again be read from disk, decrypted, and re-encrypted with the ephemeral key, but may be randomized using a different nonce used for the previous randomization (or, preferably, any prior randomization of these data), and stored to main memory. These examples, however, are not exhaustive.

Figure 1:
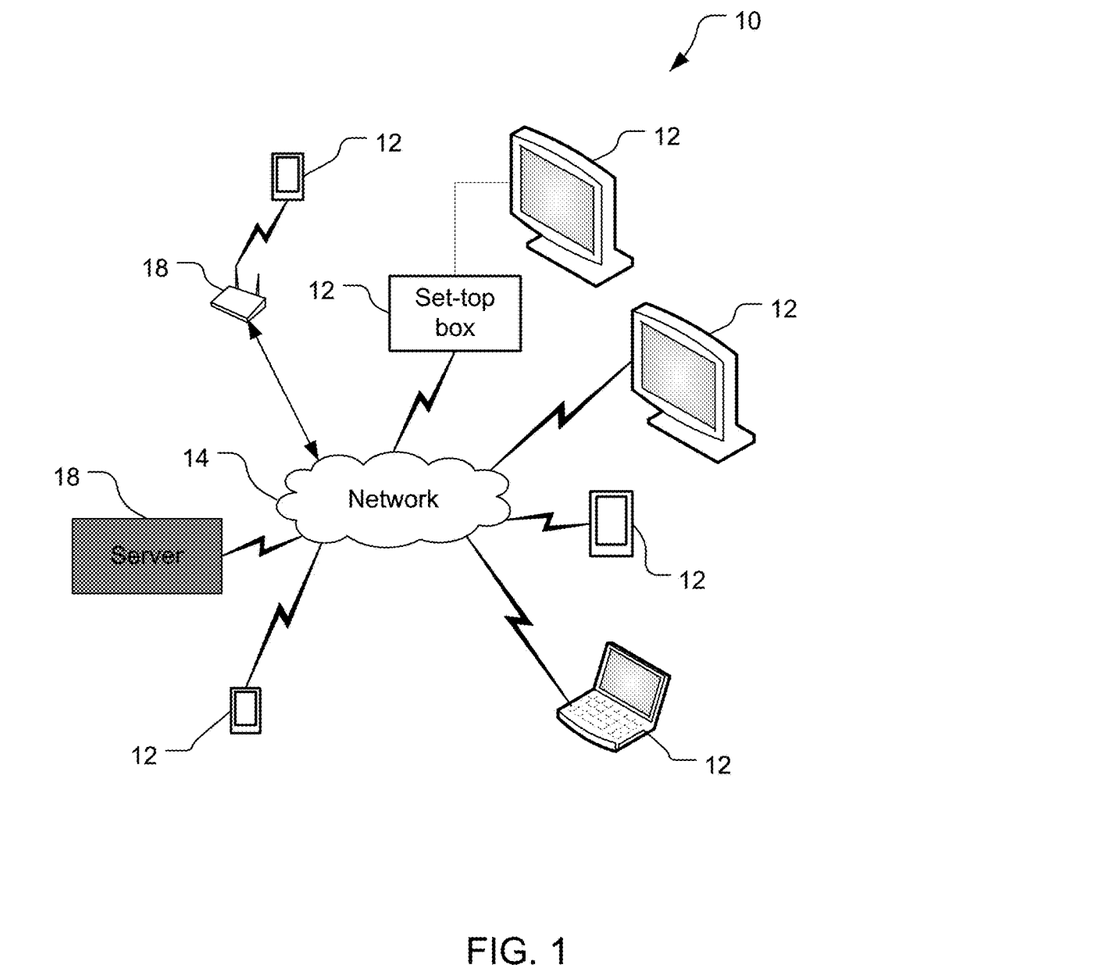
FIG. 1 is a simplified diagram of an assortment of electronic devices configured to communicate with a communications network.

Referring to FIG. 1, a system 10 includes various devices 12, here a smart phone, a blood-pressure monitor, a television, and an automobile, all in communication with a communications network 14. The devices 12 may each be configured to communicate with the network 12 directly and/or indirectly, wirelessly and/or through wired connections, possibly through an access point 16. While the ability to interact with the network 14 may provide multiple advantages for processing systems of the devices 12, this ability also may make the devices 12 susceptible to attacks, such as hackers altering instructions to be executed by the processing systems. The devices 12 shown in FIG. 1, namely a smart phone, a set-top box for a television, televisions, a tablet computer, and a laptop computer are examples of Internet of Things (IoT) devices, devices other than IoT devices may be used, including devices that are not configured to communicate with a communications network, wirelessly or through wired connections. Further, the devices 12 shown in FIG. 1 are examples only and numerous other types of devices may be used including, but not limited to other IoT devices such as proximity sensors, camera sensors, remote locks, garage door openers, irrigation systems, weather sensors, etc.

Figure 2:
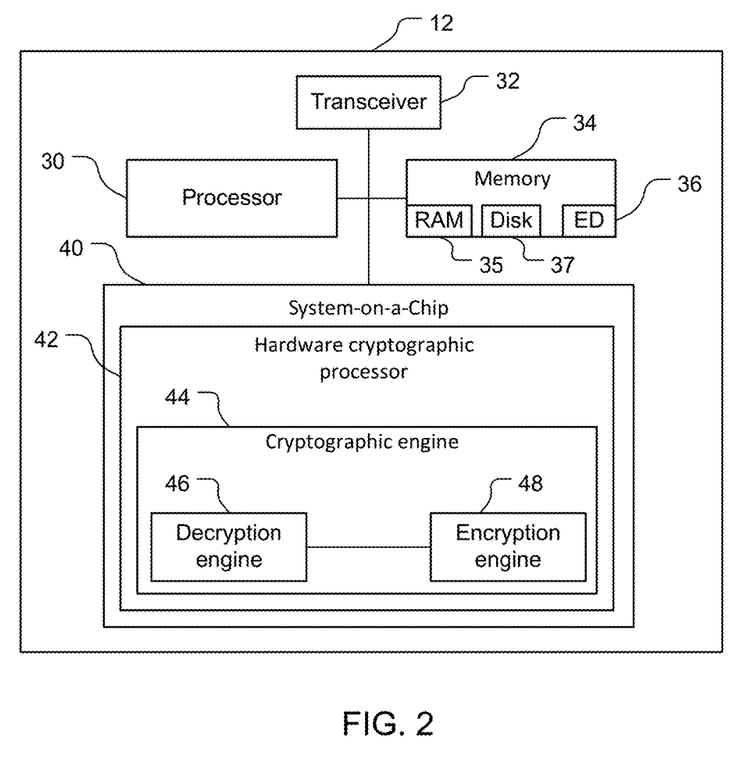
FIG. 2 is a block diagram of an example of components of a device shown in FIG. 1.

Referring also to FIG. 2, an example of the devices 12 shown in FIG. 1 includes a processor 30, a transceiver 32, a memory 34, and a System-on-a-Chip (SoC) 40. The processor 30 may include multiple physical entities, and these entities may be physically distributed throughout the device 12. The transceiver 32 is communicatively coupled to the processor 30, the memory 34, and the SoC 40 and is configured to bi-directionally communicate with the network 14. The transceiver 32 may be configured to communicate with the network 14 through one or more wired connections and/or wirelessly, either directly or indirectly (e.g., through the access point 16). The processor 30 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The memory 34 includes random access memory (RAM) 35, read-only memory (ROM), and disk memory 37 that may include one or more disks. The memory 34 is configured to store data including encrypted data (ED) 36 that may comprise one or more of a variety of types of data such as graphics, text, software instructions, etc. The memory 34 is communicatively coupled to the processor 30 and both the memory 34 and the processor 30 are communicatively coupled to the SoC 40. The SoC 40 includes a hardware cryptographic processor 42 that is communicatively coupled to the memory 34 and the processor 30. The processor 42 comprises hardware such that the cryptographic engine and other parts of the processor 42 are tamper resistant in that they perform functions without using software and exchange information with each other without putting the information on a bus accessible outside of the processor 42. The processor 42 includes a cryptographic engine 44 that includes a decryption engine 46 and an encryption engine 48. The decryption engine 46 and the encryption engine 48 may each be implemented by one or more application-specific integrated circuits (ASICs), respective parts of an ASIC, or as software running in a protected execution environment with the software being set up at boot time and thereafter unchangeable. Further, the decryption engine 46 may include more than one decryption engine and/or the encryption engine 48 may include more than one encryption engine (see FIG. 3 and discussion below). One or more of the multiple decryption engines and one or more of the multiple encryption engines may be communicatively coupled to be one or more crypto-engine pairs. In a crypto-engine pair, the encryption engine processes plain text produced by the decryption engine in that pair. The crypto-engine pairs may process data in parallel and thus may process data concurrently. Further, the decryption engine and the encryption engine in a single pair may operate concurrently, e.g., with the encryption engine processing plain text previously produced by the decryption engine while the decryption engine produces further plain text.

The decryption engine 46 is configured to decrypt encrypted data using a cryptographic key. For example, the decryption engine 46 may be configured to decrypt a first subset of the encrypted data 36 using a cryptographic device key (which may be referred to simply as the device key) associated with the device 12 to produce first plain text. The decryption engine 46 may also be configured to decrypt a second subset of the encrypted data 36 using a cryptographic device key associated with the device 12 to produce second plain text. Further, the decryption engine 46 may be configured to decrypt source-encrypted data using a source cryptographic key (associated with a source of the encrypted data 36) to produce source plain text. For example, the decryption engine 46 may be configured to use a public key of a private key/public key pair associated with the encrypted data 36 (e.g., associated with a source of the encrypted data 36 such as a software provider) to decrypt the encrypted data 36. As another example, the decryption engine 46 may use a symmetric key associated with the encrypted data 36 (e.g., associated with a source of the encrypted data 36 such as a software provider) to decrypt the encrypted data 36. The encrypted data 36 may comprise a set of encrypted data that comprises the first subset of encrypted data and the second subset of encrypted data, where the first subset of encrypted data and the second subset of encrypted data each contain less encrypted data than the set of encrypted data and are different from each other. For example, the set of encrypted data may be a software program and the first and second subsets of encrypted data may be respective pages of the software program. Alternatively, one or both of the subsets of encrypted data may be other amounts of the software program, e.g., an amount of data that the decryption engine 46 is configured to process to decrypt (or that the encryption engine 48 is configured to encrypt). This amount of data may be referred to as a block of data and may be of various sizes (e.g., 128 bits, 512 bits, etc.). One or more subsets of the encrypted data, e.g., the first subset of encrypted data, may comprise multiple blocks of encrypted data, e.g., if the first subset of encrypted data comprises a page of a software program. Each page of a software program is typically larger, e.g., 4 kbits, than a block. The decryption engine 46 may be configured to decrypt the first subset of encrypted data, containing multiple blocks of encrypted data, by decrypting each of the blocks of encrypted data separately. The resulting first plain text would comprise multiple plain text blocks corresponding to the blocks of encrypted data.

The encryption engine 48 is communicatively coupled to the decryption engine 46 and is configured to encrypt data using an ephemeral key. For example, the encryption engine 48 may be configured to encrypt source plain text using the cryptographic device key to produce the first subset of encrypted data discussed above with respect to the decryption engine 46. As another example, the encryption engine 48 may be configured to encrypt the first plain text from the decryption engine 46 using a first ephemeral device key to produce first re-encrypted data. The encryption engine 48 may also be configured to encrypt the second plain text from the decryption engine 46 using a second ephemeral key to produce second re-encrypted data, where the second ephemeral key is different from the first ephemeral key. For example, the encryption engine 48 may be configured to apply a secure hash algorithm (SHA) to the ephemeral key and the plain text to encrypt the plain text. The ephemeral keys may each be unique to a respective subset of encrypted data corresponding to plain text encrypted by the encryption engine 48. For example, each ephemeral key may be unique to a corresponding page of a software program. The encryption engine 48 may use the same ephemeral key to encrypt different portions of plain text corresponding to a single subset of encrypted data (e.g., the same page of the program). For example, the encryption engine 48 may use a single ephemeral key to encrypt different blocks of plain text corresponding to a single subset of the encrypted data 36. Also or alternatively, the encryption engine 48 may be configured to use the same ephemeral key for repeated encryptions of the single subset of the encrypted data 36 (e.g., the same page of the software program).

Figure 3:
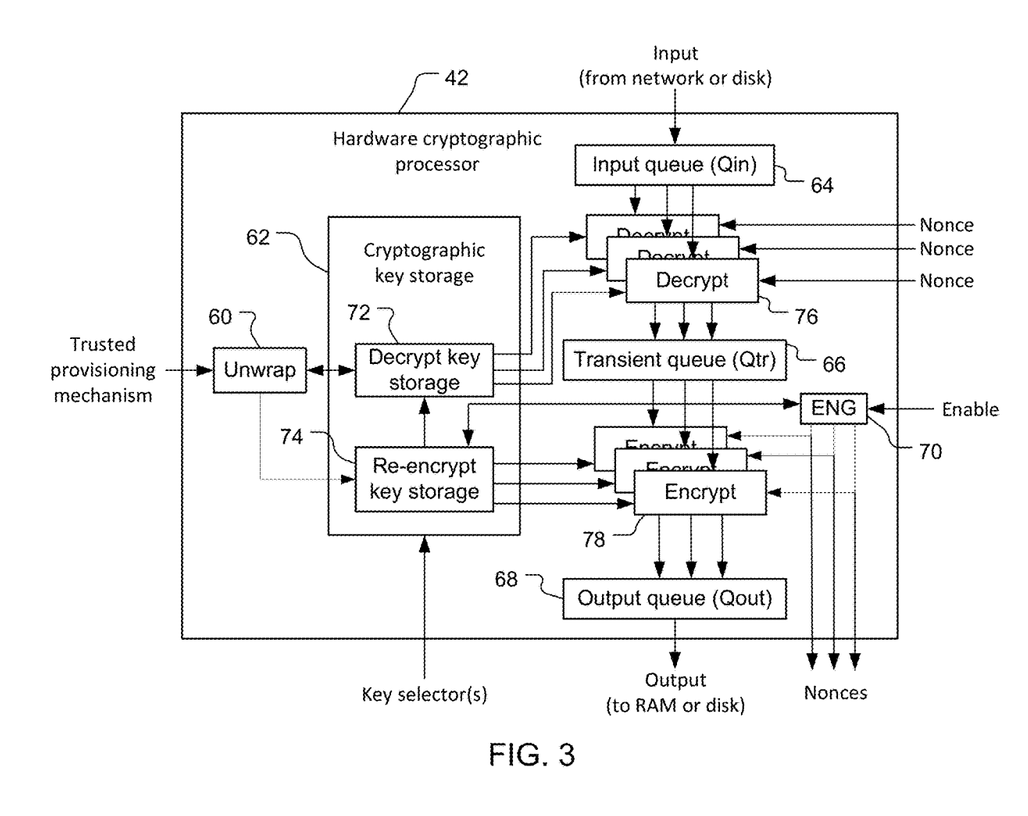
FIG. 3 is a block diagram of an example of components of a system-on-a-chip shown in FIG. 2.

Referring also to FIG. 3, an example implementation of the hardware cryptographic processor 42 shown in FIG. 2 includes an unwrap device 60, a cryptographic key storage 62, an input queue (Qin) 64, a transient queue (Qtr) 66, an output queue (Qout) 68, an ephemeral key and nonce generator (ENG) 70, multiple (three shown) decryption engines 76, and multiple (three shown) encryption engines 78. While three decryption engines 76 and three encryption engines 78 are shown, other quantities of the engines 76, 78 may be used, and the engines 76, 78 are often referred to below in the singular as preferably each of the decryption engines 76 are configured alike and preferably each of the encryption engines 78 are configured alike. The engines 76, 78 form the engines 46, 48, respectively. The cryptographic key storage 62 includes a decrypt key storage 72 and a re-encrypt key storage 74. The re-encrypt key storage 74 is communicatively coupled to the decrypt key storage 72 and configured to provide re-encrypt keys to the decrypt key storage 72. In the example of FIG. 3, each of the decryption engines 76 is paired with a respective encryption engine 78. The decryption engines 76 and the encryption engines 78 are configured such that the pairs of engines 76, 78 can operate concurrently, with one pair of engines 76, 78 processing one subset of the encrypted data 36 while another pair of the engines 76, 78 is processing another subset of the encrypted data 36. The input queue 64, the transient queue 66, and the output queue 68 may all be implemented by buffers, and two or even all three of the queues 64, 66, 68 may be implemented as portions of the same physical buffer. The transient queue 66 may be configured to be written to only by the decryption engines and only read from by the encryption engines 78. Further, the transient queue 66 may be omitted and the outputs of the decryption engines 76 directly input to the encryption engines 78. If the transient queue 66 is present, then the decryption engines 76 are configured to write only to the transient queue 66, and the encryption engines 78 are configured to read only from the transient queue 66.

The unwrap device 60 is optional but if used, is configured to communicate with a trusted provisioning mechanism to receive an encrypted cryptographic key. The encrypted cryptographic key may be a symmetric key, corresponding to encrypted data received or to be received from a supplier (e.g., a software provider), for storage in the decrypt key storage 72 and use by one or more of the decryption engines 76. The encrypted cryptographic key may be an ephemeral key for storage in the re-encrypt key storage 74 and use by one or more of the encryption engines 78. The encrypted cryptographic key may be a cryptographic device key to be associated with the device 12 and stored by both the decrypt key storage 72 and the re-encrypt key storage 74. The unwrap device 60 is further configured to unwrap (e.g., decrypt) the encrypted cryptographic key received from the trusted provisioning mechanism to reveal the cryptographic key for use in decrypting the encrypted data received from the supplier or re-encrypting plain text. The unwrap device 60 is configured to provide the unwrapped cryptographic key to the cryptographic key storage 62 for storage in the decrypt key storage 72 or the re-encrypt key storage 74 as appropriate.

The hardware cryptographic processor 42 is configured to inhibit access to the ephemeral keys stored in the cryptographic key storage 62 and used by the decryption engines 76 and the encryption engines 78. The processor 42 mechanically and electrically protects against access to the ephemeral keys. The processor 42 is part of the SoC 40 that is mechanically enclosed to inhibit mechanical probing of the processor 42. The processor 42 isolates the cryptographic keys from other parts of the device 12, providing blind encryption by the encryption engine 48. The cryptographic keys are not placed on busses that are accessible from outside of the processor 42 and are not stored in any memory (including buffers) that is accessible from outside of the processor 42. Thus, the couplings between the unwrap device 60 and the cryptographic key storage 62, between the cryptographic key storage 62 and the decryption engines 76, between the cryptographic key storage 62 and the encryption engines 78, between the ENG 70 and the cryptographic key storage 62, and between the ENG 70 and the encryption engines 78 are secure, trusted connections that are not accessible from outside of the processor 42.

The cryptographic key storage 72 is configured to receive one or more key selector signals. The decrypt key storage 72 may be configured to receive a key selector signal indicating a decryption key to be used by one or more of the decryption engines 76 and to respond to receiving the key selector signal by providing the indicated key to the appropriate decryption engine(s) 76. The re-encrypt key storage 74 may be configured to receive a key selector signal indicating an encryption key to be used by one or more of the encryption engines 78 and to respond to receiving the key selector signal by providing the indicated key to the appropriate encryption engine(s) 78.

The ephemeral key and nonce generator 70 is configured to provide ephemeral keys and, optionally, nonces. The ENG 70 is communicatively coupled to the re-encrypt key storage 74 and is configured to generate ephemeral keys and provide the ephemeral keys to the re-encrypt key storage 74. The ENG 70 may also be communicatively coupled to the encryption engines 78 and may be configured to generate nonces and provide respective nonces to the encryption engines 78. The ENG 70 may be a random-number generator configured to generate random numbers of appropriate lengths to be used as the ephemeral keys and, optionally, the nonces. The ENG 70 may provide all the nonces used by the encryption engines 78 or the ENG 70 may provide initialization vectors (IVs) that the encryption engines 78 use to produce nonces (e.g., by using the IV as an initial value that is altered, e.g., incremented using a counter, upon each subsequent use), or the ENG 70 may provide one or more nonces and one or more IVs. The ENG 70 may be triggered by an enable signal received from outside of the processor 42, or from an enable signal received from the re-encrypt key storage 74. The re-encrypt key storage 74 may be configured to send the enable signal to the ENG 70 in response to receiving an enable signal from outside of the processor 42. The ephemeral keys and/or nonces may be associated with subsets of data. For example, an ephemeral key may be associated with one or more blocks of data (e.g., blocks of plain text, and/or blocks of encrypted data to be decrypted and re-encrypted, and/or blocks of re-encrypted data). For example, each block of re-encrypted data may be associated with a unique ephemeral key. Also or alternatively, at least some sets of blocks of re-encrypted data may be associated with a single ephemeral key. Similarly, a nonce may be associated with one or more blocks of data (e.g., blocks of plain text, and/or blocks of encrypted data to be decrypted and re-encrypted, and/or blocks of re-encrypted data). For example, each block of re-encrypted data may be associated with a unique nonce. Also or alternatively, at least some sets of blocks of re-encrypted data may be associated with a single nonce.

The encryption engines 78 may be configured to randomize the re-encrypted data produced by the encryption engines 78. The discussion below refers to the encryption engine 78 in the singular for simplicity, but the discussion may apply to each of the encryption engines 78. The encryption engine 78 may obtain a nonce from the ENG 70 and apply the nonce to the re-encrypted data produced by the encryption engine 78 to change the data before being output by the encryption engine 78 and stored. For example, the encryption engine 78 may be configured to exclusive OR (XOR) the re-encrypted data with the nonce to produce randomized data. The encryption engine 78 may be configured to output the randomized data in conjunction with the nonce so that the nonce may be stored with the randomized data for ease of reversing the randomizing process before decrypting the re-encrypted data. The nonce may be associated with the randomized data in one or more other ways, such as by being stored separately from the randomized data but with an indication, e.g., an identifier, linking the nonce with the appropriate randomized data. An entity that will use the randomized data, e.g., an execution engine for executing software instructions, will be configured to reverse the randomizing, decrypt the re-encrypted data once de-randomized, and execute the decrypted instructions.

Further, the encryption engine 78 may be configured to obtain different nonces for multiple re-encryptions of the same plain text. For example, referring to one of the encryption engines 78 for simplicity, the encryption engine 78 may perform randomization of first re-encrypted data by applying a first nonce to first re-encrypted data to produce first randomized data. The decryption engines 76 may reverse the randomization to produce reproduced first randomized data and to decrypt the reproduced first randomized data using an appropriate ephemeral key (that was used to produce the first re-encrypted data) to produce plain text. The discussion below refers to the decryption engine 76 in the singular for simplicity, but the discussion may apply to each of the decryption engines 76. The encryption engine 78 may encrypt the plain text produced by the decryption engine 76 using a cryptographic device key associated with the device 12 to produce a reproduced subset of encrypted data (e.g., of the encrypted data 36). Optionally, the encryption engine 78 could apply a nonce to the reproduced subset of encrypted data. The reproduced subset of encrypted data, randomized or not, is stored in the memory 34, e.g., on the disk 37, and later read from the memory 34. The decryption engine 76 may decrypt the reproduced subset of encrypted data (reversing an randomization as appropriate) using the cryptographic device key to produce reproduced plain text. The encryption engine 78 may encrypt the reproduced plain text using an ephemeral key (e.g., the same ephemeral key that was used to produce the first re-encrypted data) to produce second re-encrypted data. The encryption engine 78 may apply a second nonce, different from the first nonce, to the second re-encrypted data to produce second randomized data that are different from the first randomized data. Thus, if the same plain text is produced multiple times (e.g., if the same software instructions are pulled from memory, swapped back out to memory, and swapped back in again), then the encryption engine 78 may obtain different nonces for the different re-encryptions such that the randomized data each time is different. This may help prevent side-channel leakage and side-channel attacks. For example, the fact that the same software instructions are being used multiple times is inhibited from being determined as the data available outside of the processor 42 will not be the same for the multiple uses.

The input queue 64 is configured to receive and store encrypted data, and to provide the encrypted data to the decryption engines 76. The received encrypted data may be received from the memory 34, e.g., disk memory, or from the network 14 (FIG. 1) via the transceiver 32 (and possibly the memory 34). The input queue 64 is connected to the memory 34 by a direct memory access (DMA) channel to read the encrypted data 36 directly from the memory 34. The input queue 64 is configured to receive and store the encrypted data 36. The input queue 64 is preferably configured to be read from only by the decryption engines 76. The decryption engines 76 are configured to read only from the input queue 64.

The output queue 68 is configured to receive and store re-encrypted data from the encryption engines 78, and to provide the encrypted data to the decryption engines 76. The output queue 68 is configured to receive and store the re-encrypted data. The output queue 68 is connected to the memory 34 by the DMA channel to write the re-encrypted data directly to the memory 34. The output queue 68 is preferably configured to be read from by one or more entities outside of the processor 42 and to be written to only by the encryption engines 78. The encryption engines 78 are configured to write only to the output queue 68.

The decryption engine 46 (e.g., the decryption engines 76) may be considered to be decryption means. Alternatively, the decryption engine 46 in conjunction with one or more other components of the device 12 may be considered decryption means. For example, the one or more other components may include the decrypt key storage 72 or the unwrap device 60. Similarly, the encryption engine 48 (e.g., the encryption engines 78) may be considered to be encryption means. Alternatively, the encryption engine 48 in conjunction with one or more other components of the device 12 may be considered encryption means. For example, the one or more other components may include the re-encrypt key storage 74, the unwrap device 60, or the ENG 70. Further, the ENG 70 may comprise ephemeral key means for producing, providing, and associating ephemeral keys with data. Alternatively, the ENG 70 in conjunction with one or more other components of the device 12 may be considered ephemeral key means. For example, the one or more other components may include the re-encrypt key storage 74 or the encryption engine 48.

Figure 4:
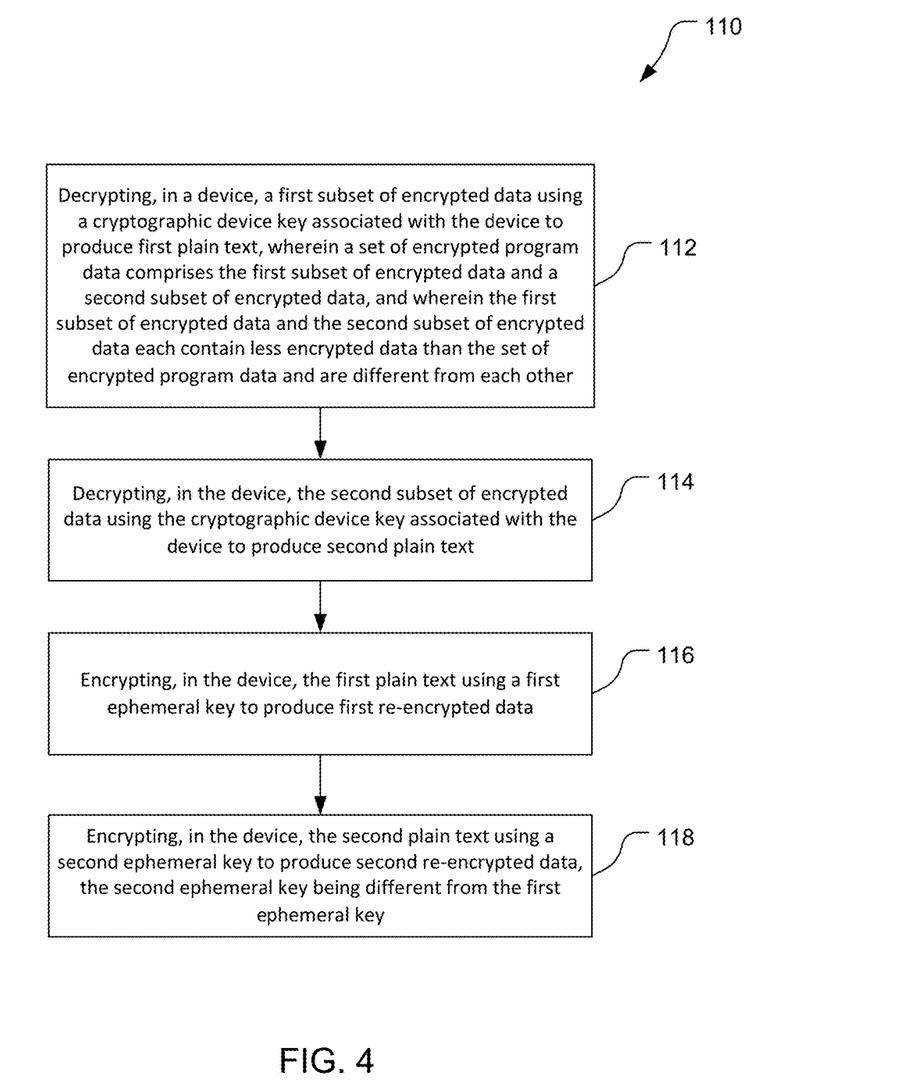
FIG. 4 is a block flow diagram of an example method according to the disclosure.
Figure 5:
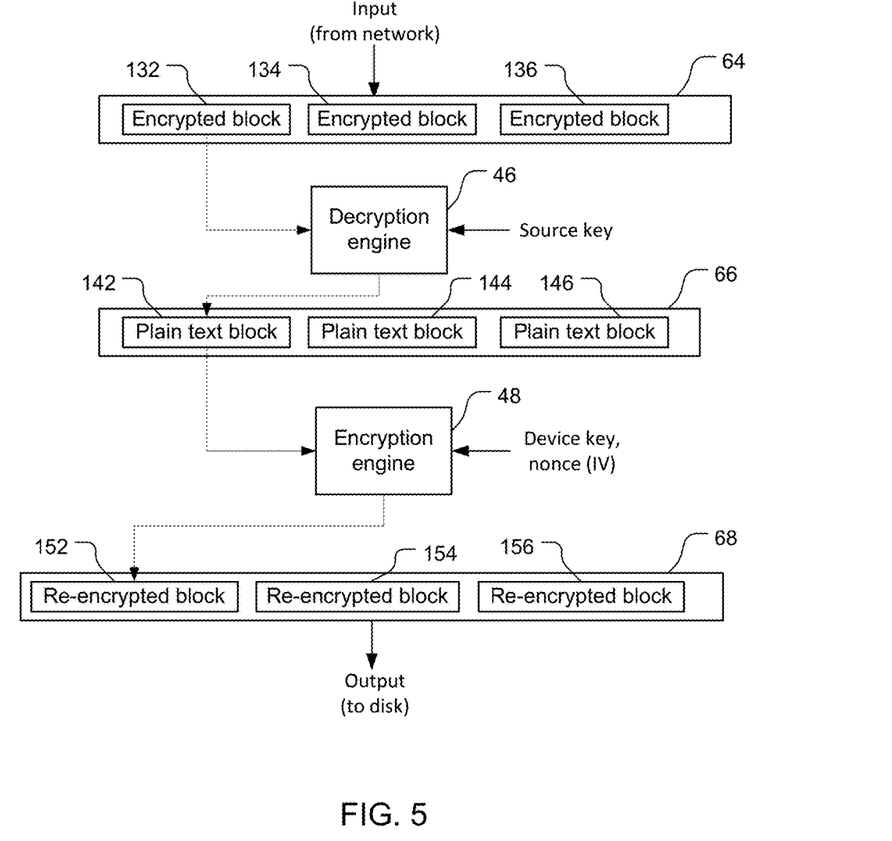
FIG. 5 is a simplified block diagram of an example implementation of the method shown in FIG. 4 for data flow between disk and main memory, through portions of the system-on-a-chip shown in FIG. 3.

Referring to FIG. 4, with further reference to FIGS. 1-3 and 5, a process 110 includes the stages shown. The process 110 may be for producing re-encrypted data from encrypted data by decrypting the encrypted data and encrypting the plain text produced by the decrypting. The process 110 is, however, an example only and not limiting. The process 110 may be altered, e.g., by having stages added, removed, rearranged, combined, performed concurrently, and/or having single stages split into multiple stages. The process 110 will be discussed below in further detail with respect to an example case of processing encrypted data stored on disk memory for storage in main memory, i.e., swapping data from disk into main memory (FIG. 5).

At stage 112, the process 110 includes decrypting, in a device, a first subset of encrypted data using a cryptographic device key associated with the device to produce first plain text, wherein a set of encrypted data comprises the first subset of encrypted data and a second subset of encrypted data, and wherein the first subset of encrypted data and the second subset of encrypted data each contain less encrypted data than the set of encrypted data and are different from each other. Some examples of the set of encrypted data may be a software program to be executed by the device 12, or non-executable information, or combinations thereof. Each of the subsets of encrypted data may, for example, be a page of a software program image, or one or more blocks of information, with each of the blocks being the amount of data that each of the decryption engines 76 processes at one time. For example, the subsets of encrypted data may be stored in the input queue 64 for reading by the decryption engine 46. The set of encrypted data may be provided to the input queue 64 in any of a variety of manners, e.g., being supplied by the network 14, either directly from the transceiver 32 to the input queue 64 or from the memory 34 (e.g., the disk 37) to the input queue 64.

As an example of stage 112, referring in particular to FIG. 5, the first subset of encrypted data may include encrypted blocks of data 162, 164 and the second subset of encrypted data may include an encrypted block of data 166. The decryption engine 46 may read encrypted blocks of data 162, 164 from the input queue 64 and decrypt the encrypted blocks of data 162, 164 using a cryptographic device key associated with the device if the encrypted blocks of data 162, 164 are block of data associated with, and were encrypted using a key (e.g., the cryptographic device key) associated with, the device 12. The decryption engine 46 may first de-randomize the encrypted blocks of data 162, 164 if the encrypted data were randomized, e.g., using a nonce. To de-randomize the encrypted blocks of data 162, 164, the decryption engine 46 obtains the nonce (e.g., by receiving the nonce from the decrypt key storage 72, or reading the nonce stored in association with the encrypted data, etc.), and reverses the randomizing process using the nonce. In this example, the encrypted blocks of data 162, 164 are associated with each other, e.g., being part of a page of an image of software. The cryptographic device key may be associated with the device 12 in that the cryptographic device key is preferably unique to the device 12, securely stored by the device 12, e.g., preferably in both the decrypt key storage 72 and the encrypt key storage 74, and used by the device 12 to encrypt data for storage on the disk 37 and decrypting data read from the disk 37 that were previously encrypted by the device 12 for storage on the disk 37. The output of the decryption engine 46 based on the encrypted blocks of data 162, 164 is plain text blocks 172, 174. The encrypted blocks of data 162, 164, may be processed serially by the same decryption engine 76 or processed serially or concurrently using separate decryption engines 76. In FIG. 5, for simplicity, only limited data flow for data processed by the decryption engine 46 and the encryption engine 48 is indicated by arrows, in particular processing that may occur concurrently.

At stage 114, the process 110 includes decrypting, in the device, the second subset of encrypted data using the cryptographic device key associated with the device to produce second plain text. For example, referring to FIG. 5, the decryption engine 46 may read the encrypted block of data 166 from the input queue 64 and decrypt this block of data using the cryptographic device key (and an appropriate nonce if the encrypted block of data 166 has been randomized) to produce a plain text block 176. The plain text produced by the decryption engine 46, e.g., the decryption engines 76, using the encrypted blocks of data 162, 164, 166, may be provided by the decryption engine 46 to the encryption engine 48, e.g., directly, or as shown in FIG. 5 through the transient queue 66 by writing the plain text into the transient queue 66 as the plain text blocks 172, 174, 176.

At stage 116, the process 110 includes encrypting, in the device, the first plain text using a first ephemeral key to produce first re-encrypted data. The first ephemeral key is associated with at least the first plain text. The ephemeral key may be associated with the first subset of encrypted data. The first ephemeral key is preferably associated with, and unique to, the first subset of encrypted data for the duration of a session of use of the set of data that comprises the first subset of encrypted data. For example, if the set of encrypted data is a set of encrypted program data, then the first ephemeral key may be associated with the first subset of encrypted data while the program is being executed (i.e., until the program is terminated), even if plain text corresponding to the first subset of encrypted data is not being executed currently. If the program is terminated, and then re-executed, then the first subset of encrypted data will preferably be associated with a different ephemeral key. The first ephemeral key may be associated directly with the first subset of encrypted data directly, e.g., by being stored in the decrypt key storage 72 and/or the re-encrypt key storage 74 with an indicator (e.g., a storage location) of the associated first subset of encrypted data. Also or alternatively, the first ephemeral key may be associated directly with the first subset of encrypted data indirectly, e.g., by being directly associated with the plain text and/or the re-encrypted data (or the randomized re-encrypted data) corresponding to the first subset of encrypted data. The ephemeral key is preferably not stored with the re-encrypted data, but rather stored in the cryptographic key storage 62 in a manner that is inaccessible from outside the hardware cryptographic processor 42.

As an example of stage 116, referring in particular to FIG. 5, with the first subset of encrypted data including the encrypted blocks of data 162, 164 corresponding to the plain text blocks 172, 174, the encryption engine 48 reads the plain text blocks 172, 174 from the transient queue 66 and encrypts the plain text blocks 172, 174 using a first ephemeral key to produce re-encrypted blocks 182, 184. The encryption engine 48 may determine the first ephemeral key, e.g., by obtaining the ephemeral key from the re-encrypt key storage 74 that obtained the ephemeral key from the unwrap device 60 or the ENG 70. The ENG 70 may generate the ephemeral key prior to the need of the ephemeral key by the encryption engine 48 or in response to the need of the ephemeral key by the encryption engine 48, e.g., in response to a request by the re-encrypt key storage 74 that may be in response to a request from the encryption engine 48. The encryption engine 48 in FIG. 5 is shown processing the plain text block 172 because the decryption engine 46 is shown processing the encrypted block of data 164. In this example, the decryption engine 46 has already processed the encrypted block of data 162 to produce the plain text block 172. Thus, the encryption engine 48 can process the plain text block 172 while the decryption engine 46 processes another encrypted block of data, e.g., the encrypted block of data 164 as shown in FIG. 5. Thus, the transient queue 66 facilitates pipelining of the data processing, which may increase speed of the processing of the data from the input queue 64 compared to implementations not using the transient queue 66. The encryption engine 48 writes the re-encrypted blocks 182, 184 to the output queue 66, from which the re-encrypted blocks 182, 184 may be output to main memory, e.g., the RAM 35.

At stage 118, the process 110 includes encrypting, in the device, the second plain text using a second ephemeral key to produce second re-encrypted data, the second ephemeral key being different from the first ephemeral key. For example, referring to FIG. 5, the encryption engine 48 may read the plain text block 176 from the input queue 64 and encrypt this block using a second ephemeral key that is different from the first ephemeral key to produce a re-encrypted block 186. The encryption engine 48 may determine second ephemeral key in a similar manner to determining the first ephemeral key. The encryption engine 48 writes the re-encrypted block 186 to the output queue 66, from which the re-encrypted block 186 may be output to main memory, e.g., the RAM 35.

The process 110 may include one or more further features or stages. For example, the re-encrypted data may be associated with a corresponding ephemeral key. Thus, for example, the process 110 may include associating the re-encrypted blocks 182, 184 with the first ephemeral key and associating the re-encrypted block 186 with the second ephemeral key. For example, the re-encrypted data may be associated with the respective ephemeral key directly or indirectly (e.g., being directly associated with one or more corresponding encrypted blocks of data and/or one or more corresponding plain text blocks). The associating of the ephemeral key with re-encrypted data may comprise storing data corresponding to the re-encrypted data (e.g., the re-encrypted data, a randomization of the re-encrypted data, etc.) in association with the ephemeral key. For example, the re-encrypted data may be stored with a pointer to a storage location of the ephemeral key, or the ephemeral key may be stored along with an indication of the re-encrypted data (e.g., an identifier of the re-encrypted data that is also stored with the re-encrypted data).

The process 110 may further include randomizing the re-encrypted data by applying a first nonce to the re-encrypted data. The randomizing of the re-encrypted data may be reversed to produce reproduced re-encrypted data, the reproduced re-encrypted data decrypted using an ephemeral key to produce reproduced plain text, the reproduced plain text encrypted using the device key to produce reproduced encrypted data, the reproduced encrypted data decrypted using the device key to produce the plain text again, this plain text encrypted (using the same ephemeral key that was used to decrypt the reproduced re-encrypted data) again, and this encrypted data randomized using a second nonce that is different from the first nonce. Applying the nonce to the re-encrypted data may comprise exclusive OR-ing the re-encrypted data with the nonce. In the above example, the reproduced encrypted data may also be randomized, and then de-randomized before being decrypted.

Figure 6:
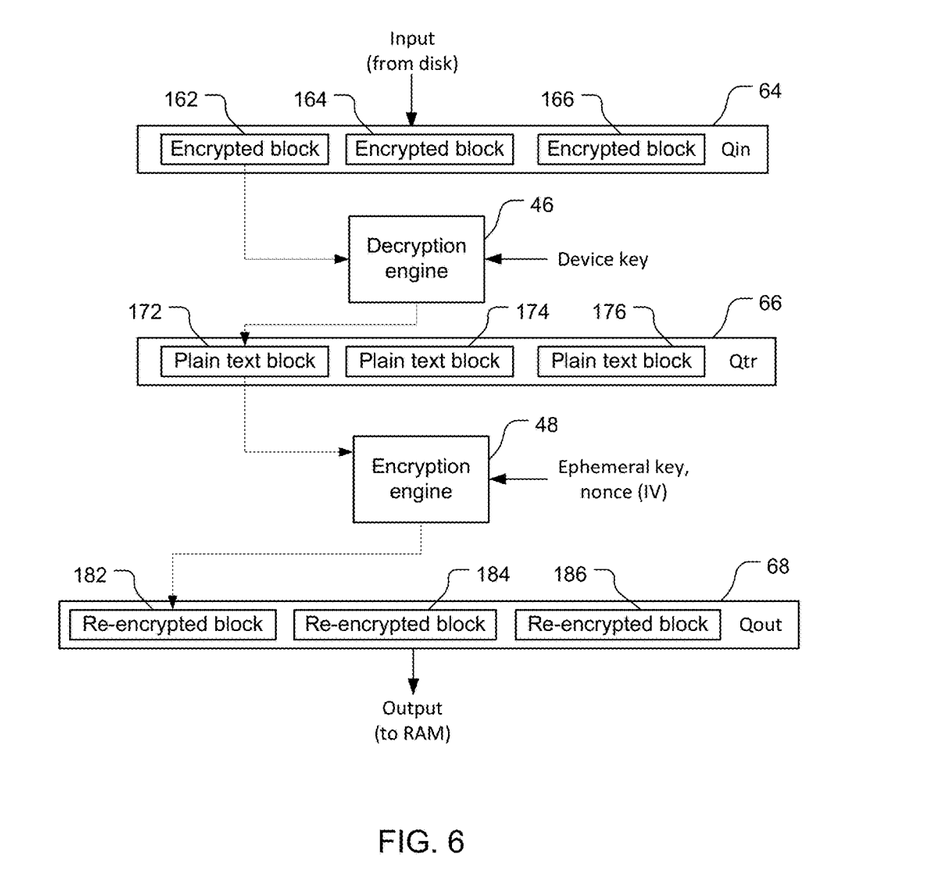
FIG. 6 is a simplified block diagram of an example of data flow between main memory and disk, through portions of the system-on-a-chip shown in FIG. 3.

With further reference to FIG. 6, the process 110 may include, e.g., after the stages 112, 114, 116, 118, decrypting encrypted data using an ephemeral key, after de-randomizing the encrypted data if appropriate, encrypting the decrypted data using the device key, and randomizing the decrypted data if desired. In this example, encrypted data stored in main memory are processed for storage in disk memory, i.e., data are swapped out from main memory to disk memory. For example, if main memory, e.g., the RAM 35, cannot hold an entire software program, and a portion of the program not presently stored in the RAM 35 is to be executed, then some of the data presently stored in the RAM 35 (preferably the least-used data presently stored in the RAM 35) are swapped out of the RAM 35 so that the portion of the program to be executed may be swapped in to the RAM 35. In FIG. 6, for simplicity, only limited data flow for data processed by the decryption engine 46 and the encryption engine 48 is indicated by arrows, in particular processing that may occur concurrently.

In FIG. 6, the decryption engine 46 may read encrypted blocks of data 212, 214 from the input queue 64 and decrypt the encrypted blocks of data 212, 214 using an ephemeral key associated with the encrypted blocks of data 212, 214. The decryption engine 46 may first de-randomize the encrypted blocks of data 212, 214 if the encrypted data were randomized, e.g., using the nonce that was used to randomize the data. To de-randomize the encrypted blocks of data 212, 214, the decryption engine 46 obtains the nonce (e.g., by receiving the nonce from the decrypt key storage 72, or reading the nonce stored in association with the encrypted data, etc.), and reverses the randomizing process using the nonce. In this example, the encrypted blocks of data 212, 214 correspond to the re-encrypted blocks 182, 184 shown in FIG. 5 and are associated with each other, e.g., being part of a page of an image of software. The ephemeral key is associated with the encrypted blocks of data 212, 214 in that encryption engine 48 previously produced the encrypted blocks of data 212, 214 by encrypting plain text using the ephemeral key, and possibly randomizing the encrypted data using a nonce. The output of the decryption engine 46 based on the encrypted blocks of data 212, 214 is plain text blocks 222, 224. The encrypted blocks of data 212, 214 may be processed serially by the same decryption engine 76 or processed serially or concurrently using separate decryption engines 76. The decryption engine 46 may further read the encrypted block of data 216 (that in this example is the re-encrypted block 186 shown in FIG. 5) from the input queue 64 and decrypt this block of data using the ephemeral key that was used to encrypt the data (and an appropriate nonce if the encrypted block of data 216 has been randomized) to produce a plain text block 226. The decryption engine 46 writes the plain text blocks 222, 224, 226 to the transient queue 66, e.g., as each of these blocks is produced.

Also in FIG. 6, the encryption engine 48 encrypts the plain text blocks 222, 224, 226 using the device key, and optionally a nonce. The encryption engine 48 reads the plain text blocks 222, 224, 226 from the transient queue 66 and encrypts these blocks using the device key to produce re-encrypted data that the encryption engine 48 writes to the output queue as re-encrypted blocks 232, 234, 236. Optionally, the may randomize the re-encrypted data using one or more nonces and store the randomized data as the re-encrypted blocks 232, 234, 236 in association with the one or more nonces (e.g., in the output queue 66 associated with the respective block(s) and/or in the cryptographic key storage, or even outside of the hardware cryptographic processor 42 (e.g., on the disk 37 with the re-encrypted blocks 232, 234 236). The re-encrypted blocks 232, 234, 236 may be output by and/or read from the output queue 68 and written into the memory 34, e.g., the disk 37. The data thus stored to the disk 37 may be further processed as discussed above with respect to FIG. 5 and retrieved from the disk 37, decrypted, re-encrypted, and output to main memory, e.g., for access by an execution engine to execute program instructions in the data in the case of the data containing processor-executable instructions.

Figure 7:
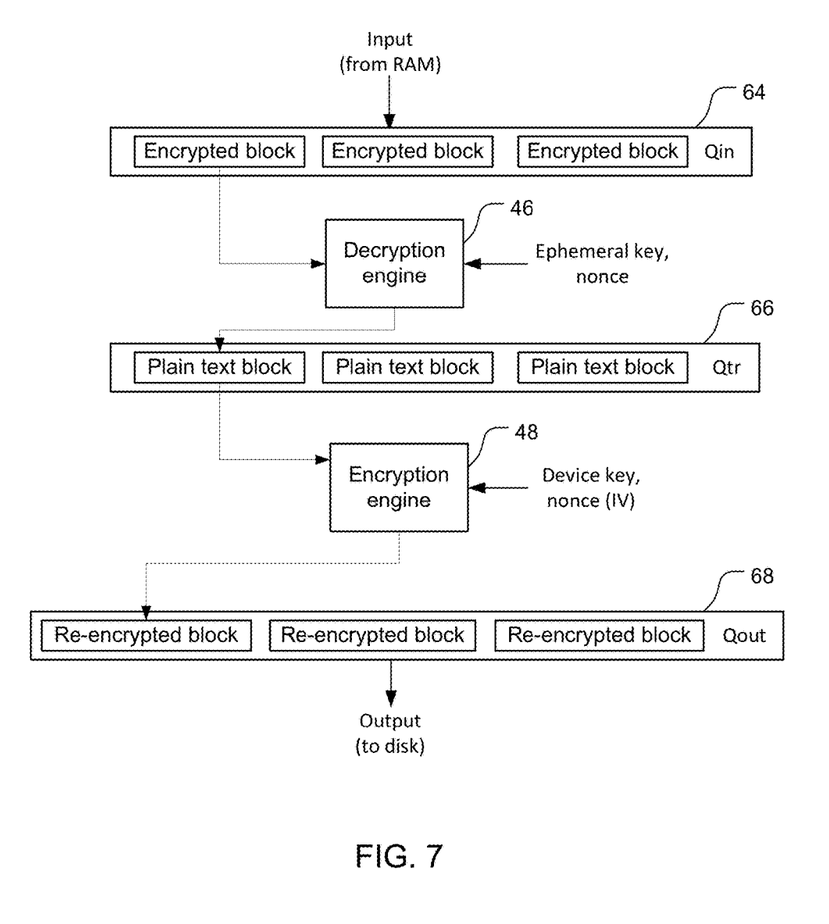
FIG. 7 is a simplified block diagram of an example of data flow between cloud storage and disk, through portions of the system-on-a-chip shown in FIG. 3.

Referring to FIG. 7, the process 110 may further include receiving encrypted data from a source, decrypting the received data, encrypting the decrypted data to produce re-encrypted data, and outputting the re-encrypted data for storage, e.g., on disk memory. The encrypted blocks of data 132, 134, 136 may have been written to the input queue 64 from the transceiver 32 or from the memory 34, e.g., the disk 37. The decryption engine 46 may read the encrypted blocks of data 132, 134, 136 from the input queue 64 and decrypt the encrypted blocks of data 132, 134, 136 using a cryptographic source key (which may be referred to simply as the source key) if the encrypted blocks of data 132, 134, 136 are blocks of source data associated with, and encrypted using a key associated with, a source of the data such as a software supplier. The source key may be read from the decrypt key storage 72, having been stored there, e.g., after being received from a trusted provisioning mechanism and unwrapped by the unwrap device 60, or during manufacture of the device 12, or by some other means and/or at some other time. The output of the decryption engine 46 based on the encrypted blocks of data 132, 134, 136 is plain text blocks 142, 144, 146 (which may be referred to as source plain text). The encrypted blocks of data 132, 134, 146, may be processed serially by the same decryption engine 76 or processed serially or concurrently using separate decryption engines 76. In FIG. 7, for simplicity, only limited data flow for data processed by the decryption engine 46 and the encryption engine 48 is indicated by arrows, in particular processing that may occur concurrently.

Also in FIG. 7, the plain text blocks 142, 144, 146 may be encrypted to produce re-encrypted blocks. The encryption engine 48 encrypts the plain text blocks 142, 144, 146 (i.e., the source plain text) using the device key associated with the device 12, and optionally randomized the encrypted data, to produce re-encrypted data that the encryption engine 48 writes to the output queue 68 as re-encrypted blocks 152, 154, 156. The re-encrypted blocks 152, 154, 156 may be output by or read from the output queue 68 and stored, e.g., in the memory 34 such as on the disk 37. The data on the disk may be further processed, e.g., according to the descriptions of FIGS. 4-5, with the re-encrypted blocks 152, 154, 156 corresponding to the encrypted blocks of data 162, 164, 166.

Other Considerations

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include that the information is conveyed from a sending entity but does not reach an intended recipient of the information. The intended recipient, even though not actually receiving the information, may still be referred to as a receiving entity, e.g., a receiving execution environment.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

What is claimed is:

1. A method comprising:

decrypting, using a hardware decryption engine of a cryptographic processor in a device, a first subset of encrypted data using a cryptographic device key associated with the device to produce first plain text, wherein a set of encrypted data comprises the first subset of encrypted data and a second subset of encrypted data, and wherein the first subset of encrypted data and the second subset of encrypted data each contain less encrypted data than the set of encrypted data and are different from each other, the cryptographic device key and the first plain text being stored, without requiring user input, in memory of the cryptographic processor inaccessible from outside of the cryptographic processor;

decrypting, using the decryption engine, the second subset of encrypted data using the cryptographic device key associated with the device to produce second plain text, the second plain text being stored, without requiring user input, in the memory of the cryptographic processor inaccessible from outside of the cryptographic processor, wherein decrypting the first and second subsets of the encrypted data is responsive to receiving the encrypted data from a data source;

encrypting, using a hardware encryption engine of a cryptographic processor in the device, the first plain text using a first ephemeral key to produce first re-encrypted data, the first ephemeral key being stored, without requiring user input, in the memory of the cryptographic processor inaccessible from outside of the cryptographic processor;

encrypting, using the encryption engine, the second plain text using a second ephemeral key to produce second re-encrypted data, the second ephemeral key being different from the first ephemeral key, the second ephemeral key being stored, without requiring user input, in the memory of the cryptographic processor inaccessible from outside of the cryptographic processor;

randomizing, using the encryption engine, the first re-encrypted data by applying a first nonce to the first re-encrypted data to produce first randomized data;

storing, without requiring user input, the first randomized data in a memory of the device outside of the cryptographic processor;

reversing, using the decryption engine, the randomization of and decrypting the first randomized data to produce third plaintext data responsive to a request to access the first randomized data, the third plain text being stored, without requiring user input, in the memory of the cryptographic processor inaccessible from outside the cryptographic processor;

generating second randomized data by re-encrypting the third plaintext data by encrypting the third plaintext content using a different cryptographic key than was used for the first randomized data and randomizing the encrypted third plaintext content using a second nonce different than the first nonce, the key used to encrypt the third plaintext being stored, without requiring user input, in the memory of the cryptographic processor inaccessible from outside the cryptographic processor; and storing, without requiring user input, the second randomized data in the memory of the device outside of the cryptographic processor after processing the request to access the first randomized data.

2. The method of claim 1, wherein the first ephemeral key is unique to the first subset of encrypted data.

3. The method of claim 1, wherein the first subset of encrypted data comprises a plurality of blocks of encrypted data, wherein decrypting the first subset of encrypted data comprises decrypting each of the plurality of blocks of encrypted data separately, wherein the first plain text comprises a plurality of plain text blocks corresponding to the plurality of blocks of encrypted data, and wherein encrypting the first plain text comprises encrypting each of the plurality of plain text blocks using the first ephemeral key.

4. The method of claim 1, further comprising:
determining, in the device, the first ephemeral key to use for encryption of the first plain text; and
determining, in the device, the second ephemeral key to use for encryption of the second plain text.

5. The method of claim 4, wherein determining the first ephemeral key comprises generating the first ephemeral key in hardware of the device.

6. The method of claim 1, further comprising:
associating, in the device, the first re-encrypted data with the first ephemeral key; and
associating, in the device, the second re-encrypted data with the second ephemeral key.

7. The method of claim 6, wherein associating the first re-encrypted data with the first ephemeral key further comprises storing a first pointer to a location of the first ephemeral key with the first re-encrypted data, and wherein associating the second re-encrypted data with the second ephemeral key comprises storing a second pointer to a location of the second ephemeral key with the second re-encrypted data.

8. The method of claim 6, wherein associating the first re-encrypted data with the first ephemeral key comprises storing data corresponding to the first re-encrypted data in association with the first ephemeral key, and wherein associating the second re-encrypted data with the second ephemeral key comprises storing data corresponding to the second re-encrypted data in association with the second ephemeral key.

9. The method of claim 1, wherein reversing the randomization of and decrypting the first randomized data further comprises:
reversing the randomizing to produce reproduced first re-encrypted data using the first nonce and the first randomized data, wherein the reproduced first re-encrypted data match the first re-encrypted data;
decrypting the reproduced first re-encrypted data using the first ephemeral key to produce third plain text; and wherein generating second randomized data by re-encrypting the first randomized data using different cryptographic keys than those used for the first randomized data and re-randomizing the first randomized data using a second nonce different than the first nonce further comprises:
encrypting the third plain text using the cryptographic device key to produce a reproduced first subset of encrypted data;
decrypting the reproduced first subset of encrypted data using the cryptographic device key to produce fourth plain text;
encrypting the fourth plain text using the first ephemeral key to produce third re-encrypted data; and
applying a second nonce, that is different from the first nonce, to the third re-encrypted data to produce second randomized data that are different from the first randomized data.

10. The method of claim 9, wherein applying the first nonce to the first re-encrypted data comprises exclusive OR-ing the first nonce and the first re-encrypted data.

11. A device comprising:
a memory; and
a hardware cryptographic processor communicatively coupled to the memory and comprising:
a decryption engine configured to:
decrypt a first subset of encrypted data using a cryptographic device key associated with the device to produce first plain text, the cryptographic device key and the first plain text being stored, without requiring user input, in memory of the cryptographic processor inaccessible from outside of the hardware cryptographic processor; and
decrypt a second subset of encrypted data using the cryptographic device key associated with the device to produce second plain text, the second plain text being stored, without requiring user input, in the memory of the cryptographic processor inaccessible from outside of the cryptographic processor, wherein decrypting the first and second subsets of the encrypted data is responsive to receiving the encrypted data from a data source;
wherein a set of encrypted data comprises the first subset of encrypted data and the second subset of encrypted data, and wherein the first subset of encrypted data and the second subset of encrypted data each contain less encrypted data than the set of encrypted data and are different from each other; and
an encryption engine communicatively coupled to the decryption engine and configured to:
encrypt the first plain text using a first ephemeral key to produce first re-encrypted data, the first ephemeral key being stored, without requiring user input, in the memory of the cryptographic processor inaccessible from outside of the hardware cryptographic processor;
encrypt the second plain text using a second ephemeral key to produce second re-encrypted data, the second ephemeral key being different from the first ephemeral key, the second ephemeral key being stored, without requiring user input, in the memory of the cryptographic processor inaccessible from outside of the hardware cryptographic processor;
randomize the first re-encrypted data by applying a first nonce to the first re-encrypted data to produce first randomized data; and
store, without requiring user input, the first randomized data in a memory of the device outside of the cryptographic processor,
wherein the decryption engine is further configured to reverse the randomization on the first randomized data and to decrypt the first randomized data to produce third plaintext content responsive to a request to access the first randomized data, the third plain text being stored, without requiring user input, in the memory of the cryptographic processor inaccessible from outside the cryptographic processor, and
wherein the encryption engine is configured to generate second randomized data by encrypting the third plaintext content using a different cryptographic key than was used for the first randomized data and randomizing the encrypted third plaintext content using a second nonce different than the first nonce, the key used to encrypt the third plaintext being stored, without requiring user input, in the memory of the cryptographic processor inaccessible from outside the cryptographic processor; and
wherein the encryption engine is configured to store, without requiring user input, the second randomized data in the memory of the device outside of the cryptographic processor after processing the request to access the first randomized data.

12. The device of claim 11, wherein the first ephemeral key is unique to the first subset of encrypted data.

13. The device of claim 11, wherein the first subset of encrypted data comprises a plurality of blocks of encrypted data, wherein the decryption engine is configured to decrypt the first subset of encrypted data by decrypting each of the plurality of blocks of encrypted data separately, wherein the first plain text comprises a plurality of plain text blocks corresponding to the plurality of blocks of encrypted data, and wherein the encryption engine is configured to encrypt the first plain text by encrypting each of the plurality of plain text blocks using the first ephemeral key.

14. The device of claim 11, wherein the decryption engine is configured to decrypt the second subset of encrypted data while the encryption engine encrypts the first plain text.

15. The device of claim 11, wherein the decryption engine and the encryption engine are a first crypto-engine pair, the hardware cryptographic processor further comprising a second crypto-engine pair configured to operate concurrently with the first crypto-engine pair.

16. The device of claim 11, wherein the hardware cryptographic processor further comprises an input queue communicatively coupled to the decryption engine and an output queue communicatively coupled to the encryption engine, wherein the decryption engine is configured to read the first subset of encrypted data and the second subset of encrypted data from the input queue, wherein the encryption engine is configured to write the first re-encrypted data and the second re-encrypted data to the output queue, wherein the input queue is configured to be read from only by the decryption engine, and wherein the output queue is configured to be written to only by the encryption engine.

17. The device of claim 11, wherein the hardware cryptographic processor further comprises an ephemeral key engine configured to:
produce the first ephemeral key and the second ephemeral key; and
provide the first ephemeral key and the second ephemeral key to the encryption engine;
wherein the hardware cryptographic processor is configured to inhibit access to the first ephemeral key and the second ephemeral key from outside of the hardware cryptographic processor.

18. The device of claim 17, wherein the ephemeral key engine comprises a random-number generator.

19. The device of claim 11, wherein:
the decryption engine being configured to reverse the randomization on the first randomized data and to decrypt the first randomized data to produce third plaintext content is further configured to:
reverse the randomization to produce reproduced first re-encrypted data using the first nonce and the first randomized data, wherein the reproduced first re-encrypted data match the first re-encrypted data; and
decrypt the reproduced first re-encrypted data using the first ephemeral key to produce third plain text;
wherein the encryption engine is configured to generate second randomized data by encrypting the third plaintext content using different cryptographic keys than were used for the first randomized data, and wherein the encryption engine is further configured to encrypt the third plain text using the cryptographic device key to produce a reproduced first subset of encrypted data;
the decryption engine is further configured to decrypt the reproduced first subset of encrypted data using the cryptographic device key to produce fourth plain text; and
the encryption engine is further configured to:
encrypt the fourth plain text using the first ephemeral key to produce third re-encrypted data; and
apply a second nonce, that is different from the first nonce, to the third re-encrypted data to produce second randomized data that are different from the first randomized data.

20. The device of claim 19, wherein the hardware cryptographic processor further comprises a nonce engine configured to:
produce the first nonce and the second nonce; and
provide the first nonce and the second nonce to the encryption engine;
wherein the hardware cryptographic processor is configured to inhibit access to the first ephemeral key and the second ephemeral key from outside of the hardware cryptographic processor.

21. The device of claim 11, wherein:
the decryption engine is further configured to decrypt source-encrypted data using a source cryptographic key to produce source plain text; and
the encryption engine is further configured to encrypt the source plain text using the cryptographic device key to produce the first subset of encrypted data.

22. A device comprising:
hardware encryption means; and
hardware decryption means for:
decrypting a first subset of encrypted data using a cryptographic device key associated with the device to produce first plain text, the cryptographic device key and the first plain text being stored, without requiring user input, in memory inaccessible from outside of the hardware decryption means and a hardware encryption means; and
decrypting a second subset of encrypted data using the cryptographic device key associated with the device to produce second plain text, the second plain text being stored, without requiring user input, in the memory inaccessible from outside of the hardware decryption means and the hardware encryption means, wherein decrypting the first and second subsets of the encrypted data is responsive to receiving the encrypted data from a data source;
wherein a set of encrypted data comprises the first subset of encrypted data and the second subset of encrypted data, and wherein the first subset of encrypted data and the second subset of encrypted data each contain less encrypted data than the set of encrypted data and are different from each other; and
the hardware encryption means is communicatively coupled to the hardware decryption means, and the hardware encryption means comprises means for:
encrypting the first plain text using a first ephemeral key to produce first re-encrypted data, the first ephemeral key being stored, without requiring user input, in the memory inaccessible from outside of the hardware decryption means and the hardware encryption means;
encrypting the second plain text using a second ephemeral key to produce second re-encrypted data, the second ephemeral key being different from the first ephemeral key, the second ephemeral key being stored, without requiring user input, in the memory inaccessible from outside of the hardware decryption means and the hardware encryption means;
randomizing the first re-encrypted data by applying a first nonce to the first re-encrypted data to produce first randomized data; and
storing, without requiring user input, the first randomized data in a memory outside of the hardware decryption means and the hardware encryption means,
wherein the hardware decryption means is further for reversing the randomization on the first randomized data and for decrypting the first randomized data to produce third plaintext content responsive to a request to access the first randomized data, the third plain text being stored, without requiring user input, in the memory inaccessible from outside of the hardware decryption means and the hardware encryption means, and
wherein the hardware encryption means is further for generating second randomized data by encrypting the third plaintext content using a different ephemeral key than was used for the first randomized data and for randomizing the encrypted third plaintext content using a second nonce different than the first nonce, the key used to encrypt the third plaintext being stored, without requiring user input, in the memory inaccessible from outside of the hardware decryption means and the hardware encryption means; and
wherein the hardware encryption means is configured to store, without requiring user input, the second randomized data in the memory outside of the hardware decryption means and the hardware encryption means.

23. The device of claim 22, wherein the first ephemeral key is unique to the first subset of encrypted data.

24. The device of claim 22, wherein the first subset of encrypted data comprises a plurality of blocks of encrypted data, wherein the decryption means are configured to decrypt the first subset of encrypted data by decrypting each of the plurality of blocks of encrypted data separately, wherein the first plain text comprises a plurality of plain text blocks corresponding to the plurality of blocks of encrypted data, and wherein the encryption means are configured to encrypt the first plain text by encrypting each of the plurality of plain text blocks using the first ephemeral key.

25. The device of claim 22, wherein the decryption means are configured to decrypt the second subset of encrypted data while the encryption means encrypt the first plain text.

26. The device of claim 22, further comprising an input queue communicatively coupled to the decryption means and an output queue communicatively coupled to the encryption means, wherein the decryption means are further for reading the first subset of encrypted data and the second subset of encrypted data from the input queue, wherein the encryption means are further for writing the first re-encrypted data and the second re-encrypted data to the output queue, wherein the input queue is configured to be read from only by the decryption means, and wherein the output queue is configured to be written to only by the encryption means.

27. The device of claim 22, further comprising ephemeral key means for:
producing the first ephemeral key and the second ephemeral key;
providing the first ephemeral key and the second ephemeral key to the encryption means;
associating data associated with the first re-encrypted data with data corresponding to the first ephemeral key; and
associating data associated with the second re-encrypted data with data corresponding to the second ephemeral key.

28. The device of claim 22, wherein:
the decryption means are further for:
reversing the randomization to produce reproduced first re-encrypted data using the first nonce and the first randomized data, wherein the reproduced first re-encrypted data match the first re-encrypted data; and
decrypting the reproduced first re-encrypted data using the first ephemeral key to produce the third plain text;
the encryption means are further for encrypting the third plain text using the cryptographic device key to produce a reproduced first subset of encrypted data;
the decryption means are further for decrypting the reproduced first subset of encrypted data using the cryptographic device key to produce fourth plain text; and
the encryption means are further for:
encrypting the fourth plain text using the first ephemeral key to produce third re-encrypted data; and
applying a second nonce, that is different from the first nonce, to the third re-encrypted data to produce second randomized data that are different from the first randomized data.

29. The device of claim 28, further comprising nonce means for:
producing the first nonce and the second nonce; and
providing the first nonce and the second nonce to the encryption means;
associating the first nonce with data corresponding to the first re-encrypted data; and
associating the second nonce with data corresponding to the second re-encrypted data.

30. The device of claim 22, wherein:
the decryption engine is further configured to decrypt source-encrypted data using a source cryptographic key to produce source plain text; and
the encryption engine is further configured to encrypt the source plain text using the cryptographic device key to produce the first subset of encrypted data.

* * * * *